United States Patent [19]

Wu

[11] Patent Number: 5,433,499
[45] Date of Patent: Jul. 18, 1995

[54] EXTENDABLE SUNSHADE MAGNETICALLY ATTACHABLE TO A CAR ROOF

[76] Inventor: Ming-Kuei Wu, No. 572 Minchan 2nd Rd., Chien Chen District, Kachiung, Taiwan

[21] Appl. No.: 207,216

[22] Filed: Mar. 8, 1994

[51] Int. Cl.$^6$ .............................................. B60J 7/20
[52] U.S. Cl. ..................................... 296/95.1; 296/136
[58] Field of Search ....................... 296/95.1, 136, 98; 160/DIG. 16; 224/309

[56] References Cited

U.S. PATENT DOCUMENTS

| 3,050,075 | 8/1962 | Kaplan et al. | 296/98 |
| 4,929,016 | 5/1990 | Kastanis | 296/136 |
| 5,050,925 | 9/1991 | Brown | 296/136 |

FOREIGN PATENT DOCUMENTS

| 197710 | 10/1977 | Germany | 296/136 |

*Primary Examiner*—Joseph Pape
*Attorney, Agent, or Firm*—Beveridge, DeGrandi, Weilacher & Young

[57] ABSTRACT

Disclosed is an extendable sunshade magnetically attached to the roof of a car, being characterized in that a roller box is used to contain two sunshade rollers so that extendable sunshades wound around the two rollers may be extended in opposite directions, that a support is connected to a bottom of the roller box, and a rubber plate receiving a plurality of magnets is connected to a bottom surface of the support, so that the roller box can be magnetically attached to the roof of a car. The disclosed extendable sunshade may be used to shield the metal roof and windshields of the car, or, alternatively, be used to cover the window glass panes of the car, depending on the shining direction of sun light, so that high temperature and oppressive heat accumulated in the car parking or moving under strong sun light may be largely lowered and the energy for air conditioning in the car can be effectively saved.

21 Claims, 3 Drawing Sheets

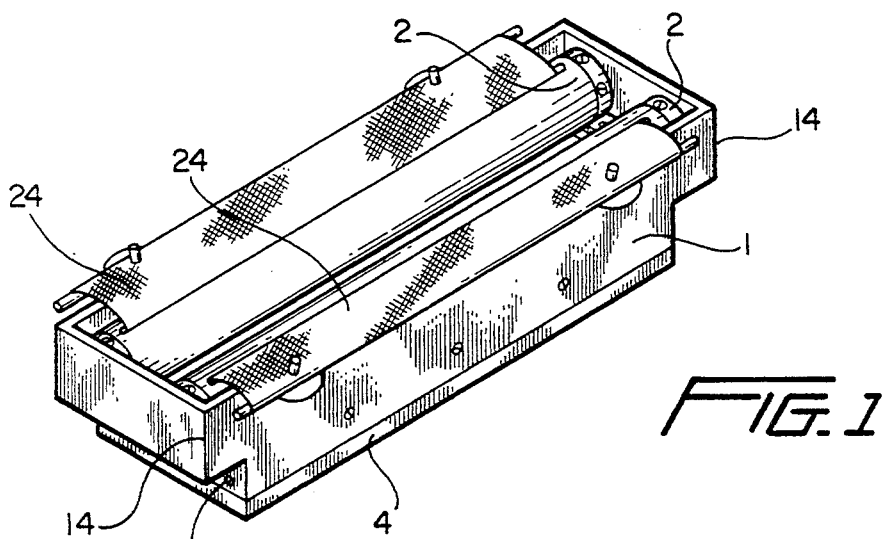
FIG. 1
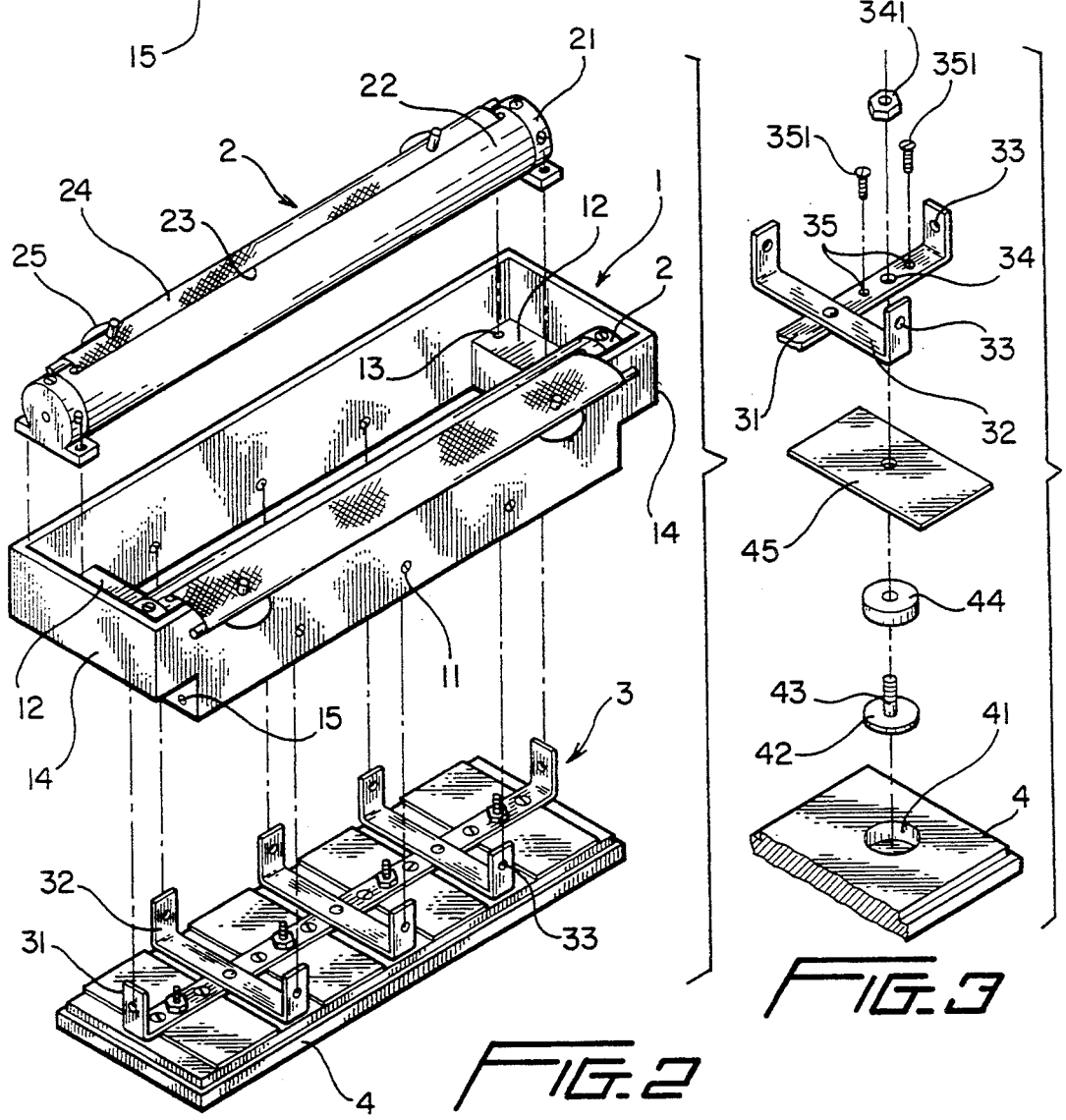
FIG. 2
FIG. 3

EXTENDABLE SUNSHADE MAGNETICALLY ATTACHABLE TO A CAR ROOF

BACKGROUND OF THE INVENTION

The present invention relates to an extendable sunshade for cars, and more particularly to an extendable sunshade which is magnetically attached to the roof of a car and which can be conveniently extended and/or retracted in two directions.

Whenever someone gets in a car which has been parked directly under the sun for a considerable period of time, he/she will no doubt suffer from and feel uncomfortable with the high and oppressive heat in the car, especially in the summer. Under this condition, he/she will usually open all the doors start the engine, and turn on the air conditioner to the highest level until the temperature in the car is somewhat lowered. This is obviously time and energy consuming. An extendable sunshade is often therefore attached to an inner side of the windshield as an alternative way of blocking the heat and seems to be considerably effective in reducing the oppressive heat in the car. However, heat absorbed by the metal roof of a car will still accumulate in the car to raise the temperature therein and causes considerable discomfort of the driver or the passengers.

In view of the disadvantages existing in the conventional sun-blocking manner and/or means by turning on an air conditioner in a door-opened car that is time and energy consuming, and by using an extendable sunshade below the windshield that can only locally block sun shine, it is therefore desirable to develop a sunshade which may overcome the above-mentioned disadvantages.

SUMMARY OF THE INVENTION

It is a primary object of the present invention to provide an extendable sunshade which is magnetically attached to the roof of a car and which can be extended in two opposite directions to provide a larger area of sun-blocking for the car.

The extendable sunshade according to the present invention mainly includes a roller box in which two rolls of a sunshade extendable and turntable in opposite directions are mounted; a support connected to a bottom of the roller box, and a rubber plate coupled with the support and having a plurality of recesses, each accommodating a magnet therein so that the roller box with extendable sunshades may be fitly and closely magnetically attached to the roof of a car. The two rolls of extendable sunshade may be retractably extended in two opposite directions to properly shield the metal roof and the front and the rear windshields of the car. Or, alternatively, the roller box may be so located that the two rolls of extendable sunshade can be extended to shield the windows at either side of the car, if they are directly exposed to sun light.

With the extendable sunshade according to the present invention, the car directly parked under the sun may be effectively prevented from having internal high temperature and oppressive heat, and thereby the operation of the air-conditioner in the car can be shortened and the energy can be effectively saved.

BRIEF DESCRIPTION OF THE DRAWINGS

The structure, usage, and functions of the present invention can be best understood by referring to the following detailed description of the preferred embodiments and the accompanying drawings, wherein FIG. 1 is an assembled perspective of the present invention;

FIG. 2 is a disassembled perspective of the present invention;

FIG. 3 is a fragmentary, exploded perspective showing the manner in which the magnet is received in the rubber plate;

DETAILED DESCRIPTION OF THE PREFERRED EMBODIMENTS

Figure 4:
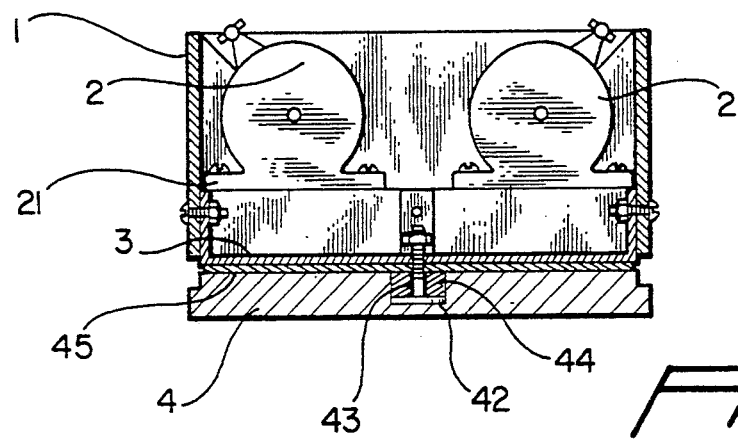
FIG. 4 is a side sectional view of the present invention.

Please refer to FIGS. 1, 2, and 3. The present invention mainly includes a roller box 1, two sunshade rollers 2 mounted in the roller box 1, a support 3 connected to a bottom of the roller box 1, and a rubber plate 4 disposed below and fastened to the support 3.

The roller box 1 is a substantially hollow container enclosed by two side walls and two end walls. First connection holes 11 are provided on the side and end walls of the roller box 1, and two roller receivers 12 are oppositely formed at an inner side of the end walls at two far ends of the roller box 1 and are formed with second connection holes 13 thereon.

The sunshade rollers 2 each have a seat 21 at each end thereof, and a housing 22 fixedly connected to the seats 21 so that a roller shaft and a spring set mounted between the seats 21 are housed by the housing 22. Since the roller shaft and the spring set are prior art, they are not shown and discussed herein. The housings 22 each are provided with a long slot 23 transversely extending the full length of the housing 22 for a roll of sunshade 24 wound on the roller shaft and contained in the housing 22 to be retractably pulled out therefrom. Sucking disks 25 are provided at a free end of the sunshade 24 so that the extended sunshade 24 can be fixedly attached to a windshield or any body portion of the car by means of the sucking disks 25.

The support 3 consists of a U-shaped main support 31 and a plurality of U-shaped secondary supports 32 each crossing and fixed to the main support 31 at intervals. A third connection hole 33 is provided at each vertical leg portion of the U-shaped supports 31, 32, and a fourth connection hole 34 is provided on the main support 31 in the middle of the interval between every two secondary supports 32. In addition, two threaded holes 35 are provided at two sides of each fourth connection hole 34.

The rubber plate 4 is provided on a top surface a plurality of recesses 41 corresponding to those fourth connection holes 34. A steel plate 42 is fixedly adhered to a bottom surface of each recess 41. The steel plate 42 each has a centered threaded rod 43 projecting from a top surface of the steel plate 42 to support a powerful magnet 44 and a steel sheet 45 thereon. The magnets 44 are separately disposed in the recesses 41 with the steel sheet 45 flatly covering the top surface of the rubber plate 4 and fixed to the latter by means of proper adhesive.

Figure 5:
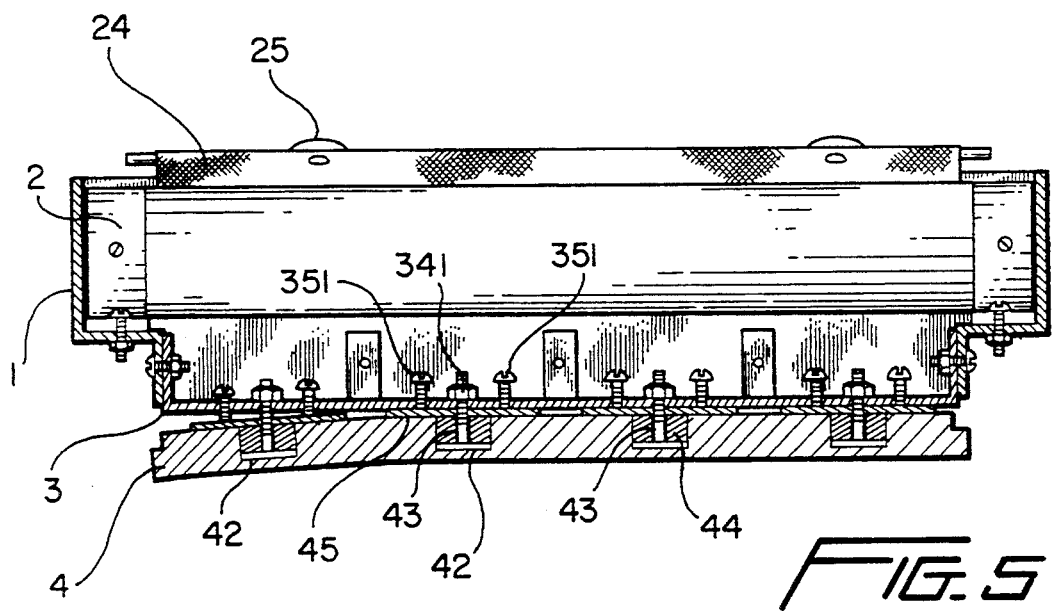
FIG. 5 is a front sectional view of the present invention.

Please refer to FIGS. 2, 4 and 5. To assemble the present invention, the rubber plate 4 is connected to the bottom side of the support 3 by extending the threaded rod 43 of each steel plate 42, fixedly adhered to the bottom of the recess 41 of the rubber plate 4, through the fourth connection hole 34 on the main support 31, and then fastening a nut 341 to the upward projected threaded rod 43; the support 3 is connected to the inner bottom of the roller box 1 by matching the third connection holes 33 on the vertical leg portions of the main and the secondary supports 31, 32 with the first connection holes 11 formed on the side and end walls of the roller box 1 and threading screws through the matched connection holes; and the two sunshade rollers 2 are fixed onto the roller receives 12 provided in and at two far ends of the roller box 1 by fastening the seats 21 to the second connection holes 13 on the roller receivers 12 with screws, with the long slots 23 on the housings 22 facing outward in two opposite directions.

Figure 7:
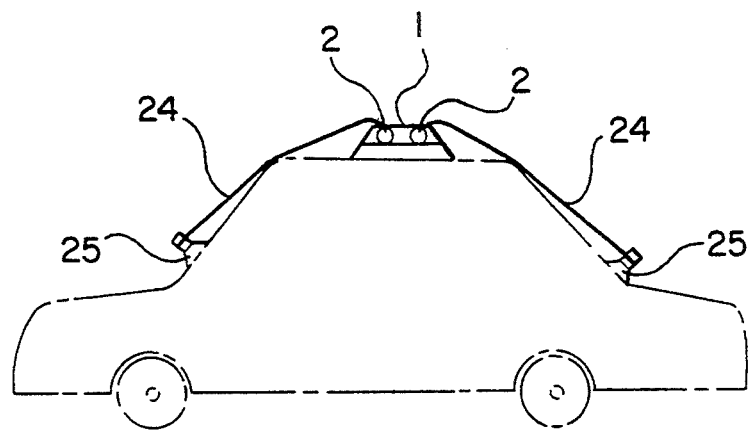
FIG. 7 illustrates the application of the present invention on a car.
Figure 7:
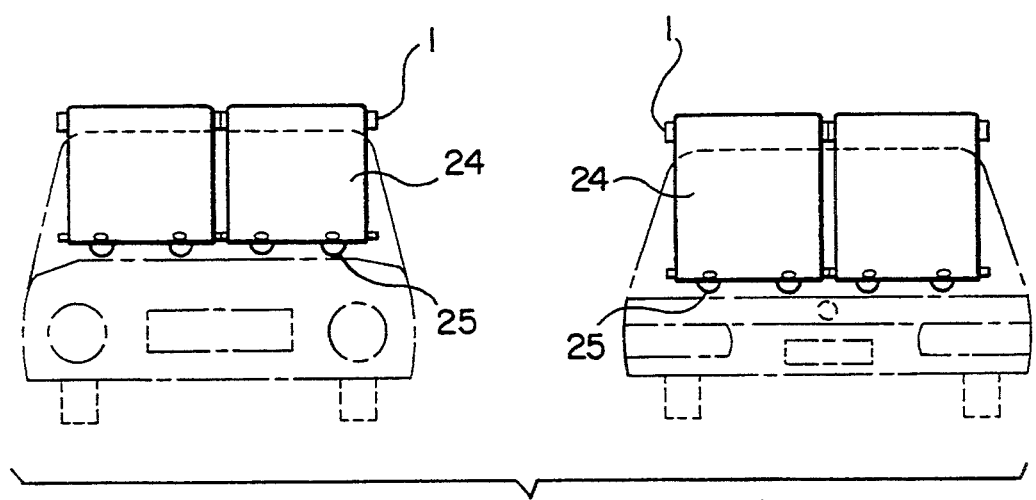

Please now refer to FIG. 7. To use the present invention the same is magnetically attached to the roof of a car at a middle position by means of the magnets 44 disposed in the recesses 41 of the rubber plate 4. The sunshades 24, separately wound on the roller shafts of the sunshade rollers 2, are pulled so that the sunshades 24 are extended outward to cover the front and the rear tops of the car, or the two lateral sides of the car. The free ends of the extended sunshades 24 are fixedly attached to the front and rear windshields or the window glass panes, respectively, by means of the sucking disks 25.

Since the sunshades 24 are disposed outside the car, a large area including both the metal roof and the peripheral glass panes of the car can be effectively shielded and thereby much less heat from the sun is absorbed by the car. Moreover, the height of the roller box 1 allows a space existing between the extended sunshades 24 and the roof when the sunshades 24 pass and are supported by the peripheral edges of the roof. This space allows air to flow therethrough and is therefore helpful in the thermal insulation, too.

Before the present invention is magnetically attached to the roof of a car, the nuts 341 fastening to the threaded rods 43 and the compression screws 351 at the two sides of each nut 341 are first loosened, so that the magnets 44 may attach to the car following the curve of the roof. Then, the nuts 341 and the compression screws 351 are tightened. This causes the rubber plate 5 to fitly and closely press against the roof along its curved surface, as shown in FIG. 5.

Since the powerful magnets 44 are separately disposed in the recesses 41 of the rubber plate 4, the magnets 44 will not cause any damage to the metal body of the car when the present invention is magnetically attached to the car. The numbers and rows of magnets 44 can be adequately increased to ensure that the magnetic attraction of the magnets 44 is strong enough for the roller box 1 to stay still during the course of pulling out the sunshades 24, or even in the wind during the course of driving. Thus, the present invention can be mounted on the roof of a car and is ready for use at any time.

Figure 6:
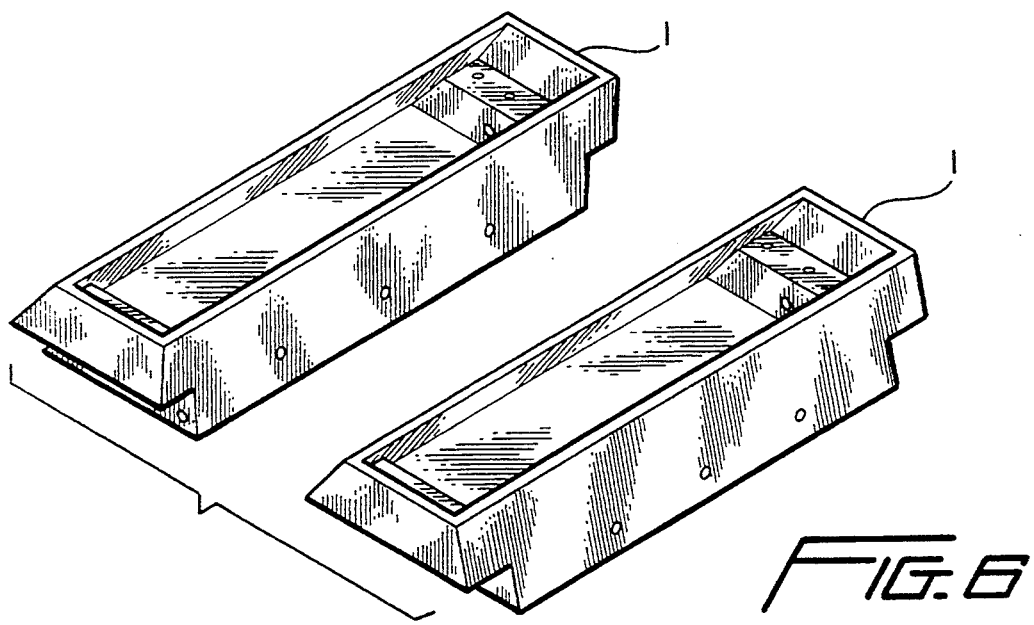
FIG. 6 illustrates two further embodiments of the roller box of the present invention.

Another embodiment of the roller box 1 is shown in FIG. 6 at the left side thereof, in which one of the side walls facing outside is an inclined plane to facilitate the guidance of air flow and thereby reduce the wind resistance during driving.

A further embodiment of the roller box 1 is also shown in FIG. 6 at the right side thereof, in which both of the side walls are symmetrically inclined planes so that the roller box 1 may be freely and more conveniently disposed on the roof of a car without any difference in the direction.

One or both of the two far ends of the roller box 1 can be designed to form one or two projected portions 14 to facilitate the holding of the roller box 1 by a user. And, drainage holes 15 are provided at a lower edge of two end walls to avoid any accumulated rain water therein.

According to the above arrangement, the present invention is simple in structure, convenient in use, and effective in thermal insulation. The high temperature and oppressive heat accumulated in a car due to strong sun light can be largely lowered, and the time for the operation of the air conditioner in the car can also be largely shortened to save a lot of energy.

What is claimed is:

1. An extendable sunshade for attachment to a roof of a car, comprising:
    a roller box,
    two parallel sunshade rollers mounted in said roller box,
    a support connected to a bottom of said roller box, and
    a rubber plate connected to a bottom surface of said support;
    said rubber plate being formed with a plurality of recesses, at least one magnet being disposed in each recess to thereby enable said roller to be magnetically attached to a roof of a car;
    said sunshade rollers being disposed such that sunshades wound about said sunshade rollers may be extended in opposite directions from a transverse long slot formed in a housing of said sunshade rollers to shield roof, windshield, and/or window glass pane of a car on which said extendable sunshade is mounted.

2. An extendable sunshade as claimed in claim 1, wherein said roller box is a substantially hollow container formed by two side walls and two end walls, wherein:
    one or both of said two side walls has an inclined plane;
    one or both of said two end walls has a laterally projecting upper portion; and
    a flat receiving seat is formed inside at least one of said end walls.

3. An extendable sunshade as claimed in claim 1, wherein said support includes a main support and a plurality of secondary supports crossing said main support;
    both said main support and said secondary supports being U-shaped and each having two vertical leg portions connected to at least one of said two side walls and at least one of said two end walls of said roller box with screws.

4. An extendable sunshade as claimed in claim 1, wherein said recesses of said rubber plate each have a steel plate adhered to a bottom surface thereof;
    said steel plates each being provided with a central threaded rod to support said at least one magnet such that said at least one magnet is received in said recess and said steel sheet covers a top surface of said rubber plate, said steel sheet being adhered to said rubber plate;
    said rubber plate being connected to said support by nuts fastened to said threaded rods of said steel plates and by compression screws located at two sides of each of said threaded rods, such that said rubber plate can be curved by adjustment of said nuts and said compression screws to approximately match the curvature of a roof of a car to which the extendable sunshade is attached.

5. An extendable sunshade as claimed in claim 1, wherein said roller box is provided with drainage holes at a lower edge of at least one of said two end walls.

6. An extendable sunshade for attachment to a roof of a car, comprising:

a roller box;

two parallel sunshade rollers mounted in said roller box; and a rubber plate connected to a bottom of said roller box, said rubber plate being formed with a plurality of recesses, at least one magnet being disposed in each recess to thereby enable said roller to be magnetically attached to a roof of a car, said sunshade rollers being disposed such that sunshades wound about said sunshade rollers may be extended in opposite directions to shield a roof, windshield, and/or a window glass pane of a car to which said extendable sunshade is attached.

7. An extendable sunshade as claimed in claim 6, wherein said rubber plate is connected to said roller box through a support connected to a bottom surface of said roller box.

8. An extendable sunshade as claimed in claim 7, wherein said support includes a main support and a plurality of secondary supports crossing said main support.

9. An extendable sunshade as claimed in claim 8, wherein said roller box is a substantially hollow container formed by two side walls and two end walls.

10. An extendable sunshade as claimed in claim 9, wherein each of said main support and said secondary supports have at least one vertical leg portion connected to at least one of said two side walls and at least one of said two end walls of said roller box.

11. An extendable sunshade as claimed in claim 10, wherein said vertical leg portions are connected to said at least one of said two side walls and at least one of said two end walls by screws.

12. An extendable sunshade as claimed in claim 6, wherein said roller box is a substantially hollow container formed by two side walls and two end walls.

13. An extendable sunshade as claimed in claim 12, wherein one or both of said two side walls has an inclined plane.

14. An extendable sunshade as claimed in claim 12, wherein one or both of said two end walls has a laterally projecting upper portion.

15. An extendable sunshade as claimed in claim 12, wherein a flat receiving seat is formed inside at least one of said two end walls.

16. An extendable sunshade as claimed in claim 12, wherein said roller box is provided with drainage holes at a lower edge of at least one of said walls forming said roller box.

17. An extendable sunshade as claimed in claim 6, wherein at least one of said recesses of said rubber plate has a steel plate adhered to a bottom surface thereof, said steel plate being provided with a central threaded rod to support said at least one magnet such that said at least one magnet is received in said recess and said steel sheet covers a top surface of said rubber plate, said steel sheet being adhered to said rubber plate.

18. An extendable sunshade as claimed in claim 6, wherein said rubber plate is connected to said support by adjusting fastening means, such that said rubber plate can be curved by adjustment of said adjusting fastening means to approximately match the curvature of a roof of a car to which the extendable sunshade is attached.

19. An extendable sunshade as claimed in claim 18, wherein a plurality of said recesses of said rubber plate each has a steel plate adhered to a bottom surface thereof, each of said steel plates being provided with a central threaded rod.

20. An extendable sunshade as claimed in claim 19, wherein said adjusting fastening means includes nuts fastened to said threaded rods of said steel plates.

21. An extendable sunshade as claimed in claim 19, wherein said adjusting fastening means includes compression screws located adjacent to at least one of said threaded rods.

* * * * *